US006422325B1

United States Patent
Krieger

(10) Patent No.: US 6,422,325 B1
(45) Date of Patent: Jul. 23, 2002

(54) METHOD FOR REDUCING BOREHOLE EROSION IN SHALE FORMATIONS

(75) Inventor: Darrell L. Krieger, Calgary (CA)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/972,366

(22) Filed: Oct. 5, 2001

(51) Int. Cl.$^7$ .................. C09K 7/06; E21B 21/08; E21B 49/00
(52) U.S. Cl. .................. 175/50; 73/152.43; 175/72; 507/103; 507/905; 507/910
(58) Field of Search .................. 175/40, 50, 72; 73/152.43, 152.46; 507/103, 905, 910

(56) References Cited

U.S. PATENT DOCUMENTS

| | | | |
|---|---|---|---|
| 4,012,329 A | 3/1977 | Hayes et al. | |
| 4,440,649 A | 4/1984 | Loftin et al. | |
| 4,508,628 A | * 4/1985 | Walker et al. | 507/905 X |
| 4,900,457 A | 2/1990 | Clarke-Sturman et al. | |
| 5,072,794 A | * 12/1991 | Hale et al. | 175/50 X |
| 5,083,622 A | * 1/1992 | Hale et al. | 175/50 X |
| 5,333,690 A | 8/1994 | Nahm et al. | 166/291 |
| 5,358,049 A | 10/1994 | Hale et al. | 166/293 |
| 5,479,987 A | 1/1996 | Hale | 166/293 |
| 5,620,947 A | 4/1997 | Elward-Berry | 507/229 |
| 5,635,458 A | 6/1997 | Lee et al. | 507/240 |
| 5,686,396 A | * 11/1997 | Hale et al. | 507/136 |
| 5,710,107 A | 1/1998 | Walker | 507/110 |
| 5,804,535 A | 9/1998 | Dobson et al. | 507/111 |
| 5,942,468 A | * 8/1999 | Dobson, Jr. et al. | 507/136 |
| 5,962,375 A | 10/1999 | Sawdon et al. | 507/140 |
| 6,006,831 A | 12/1999 | Schlemmer et al. | 166/250.01 |
| 6,017,856 A | 1/2000 | Van Ooyen | 507/276 |
| 6,029,755 A | * 2/2000 | Patel | 175/50 |

* cited by examiner

Primary Examiner—George Suchfield
(74) Attorney, Agent, or Firm—Craig W. Roddy; Karen B. Tripp

(57) ABSTRACT

A method is disclosed that provides a stable invert emulsion for an oil-based drilling fluid with an environmentally friendly additive that effectively eliminates shale hydration and consequent borehole erosion. The additive is preferably potassium formate, although other formates or acetates may be substituted. In the method, the potassium formate is dissolved in the water phase of the emulsion in lieu of other less environmentally friendly salts such as sodium chloride. The water activity of the emulsion and of the formation being drilled is monitored during drilling so that additional formate may be added as needed to maintain such water activities in balance. That is, preferably, the water activity of the potassium formate will be the same as or less than the water activity of the formation.

16 Claims, 1 Drawing Sheet

METHOD FOR REDUCING BOREHOLE EROSION IN SHALE FORMATIONS

BACKGROUND OF THE INVENTION

1. Field of the Invention

The present invention relates to oil-based drilling fluids for use in drilling wells in subterranean formations for the production of hydrocarbons. More particularly, the present invention relates to improved formulations for oil-based drilling fluids, especially invert emulsion drilling fluids, and to methods of using same, for enhanced shale stabilization.

2. Description of Relevant Art

Drilling fluids or drilling "muds" are used in drilling oil and gas wells to serve several purposes, including lubricating the drill bit, removing cuttings from the wellbore, and providing stability to the well. The appropriate design of a drilling fluid for a particular well is a major factor in the economic success of drilling a well.

Generally, drilling fluids are either water-based or "oil" (or non-aqueous) based. As used herein, the term "oil-based" shall be understood to include synthetic-based fluids and invert emulsion fluids as well as traditional oil-based fluids.

Invert emulsion drilling fluids are comprised of water dispersed in oil in the liquid phase. They are more cost-effective than water muds in a variety of situations, including, for example, without limitation, the situation of drilling through shale formations. Invert emulsion fluids can reduce or eliminate the water wetting of formation shales and thereby minimize or eliminate problems associated with sloughing shales, borehole collapse, gumbo clays and drilled solids contamination known to the petroleum industry.

An invert emulsion fluid has three phases: base fluid, water, and solids. Tiny droplets of water are dispersed in the base fluid to form a generally microscopically heterogeneous mixture of the base fluid and the water. Because emulsions are so composed of two immiscible liquids, a large amount of interfacial tension occurs at the water-droplet/base fluid interface. Thus, surface active agents or surfactants or emulsifiers are added to lower such interfacial tension to increase the stability of the emulsion.

Osmosis is the flow of a solvent (water) from a solution with a low salinity into a solution with a higher salinity through a membrane that is permeable to the solvent but not to the dissolved salt. The osmotic pressure that develops depends on the salinity of the two solutions; the greater the difference in salinity, the higher the osmotic pressure.

The salinity required in an invert emulsion fluid to avoid water transfer and the resulting swelling of formation clays (the water demand) depends on the depth and pore pressure of the shale and on the salinity of the water in the shale. When the water demand of the mud is equal to the water demand of the shale, the forces are in balance and the osmotic pressure to start water flow between the two is zero. Osmotic pressure sufficient to dehydrate shales (to cause water to flow from the formation into the mud) can be generated with salt solutions. Selecting a salt depends on formation type and its demand for water.

Calcium chloride has most commonly been the salt of choice because it offers a greater range of activity than other salts like sodium chloride. Despite its common use, calcium chloride nevertheless has become less preferred in recent years because of environmental concerns. More environmentally friendly substitutes are needed.

SUMMARY OF THE INVENTION

The present invention provides a method for drilling a wellbore in a subterranean formation, particularly or especially formations comprising shales, such that borehole erosion is substantially reduced, and borehole instability due to water absorption by the shales is effectively eliminated, as shale hydration is effectively eliminated. The method employs an invert emulsion, or an oil (or synthetic) based drilling fluid comprising an invert emulsion, which is believed to be stabilized by the method of the invention.

According to the method of the invention, the water activity of the formation and the invert emulsion is determined. A formate or acetate, and most preferably potassium formate, is added to the emulsion or the drilling fluid comprising the emulsion in a concentration such that the water activity of the emulsion (or drilling fluid) is about the same or less than the water activity of the formation. The water activity of the formation and of the emulsion (or drilling fluid) is monitored over time as the emulsion is used in drilling. Additional formate or acetate and most preferably potassium acetate is added to the drilling fluid to maintain the water activity of the fluid at about the same or lower levels than the water activity of the formation.

DETAILED DESCRIPTION OF THE INVENTION

Figure 1:
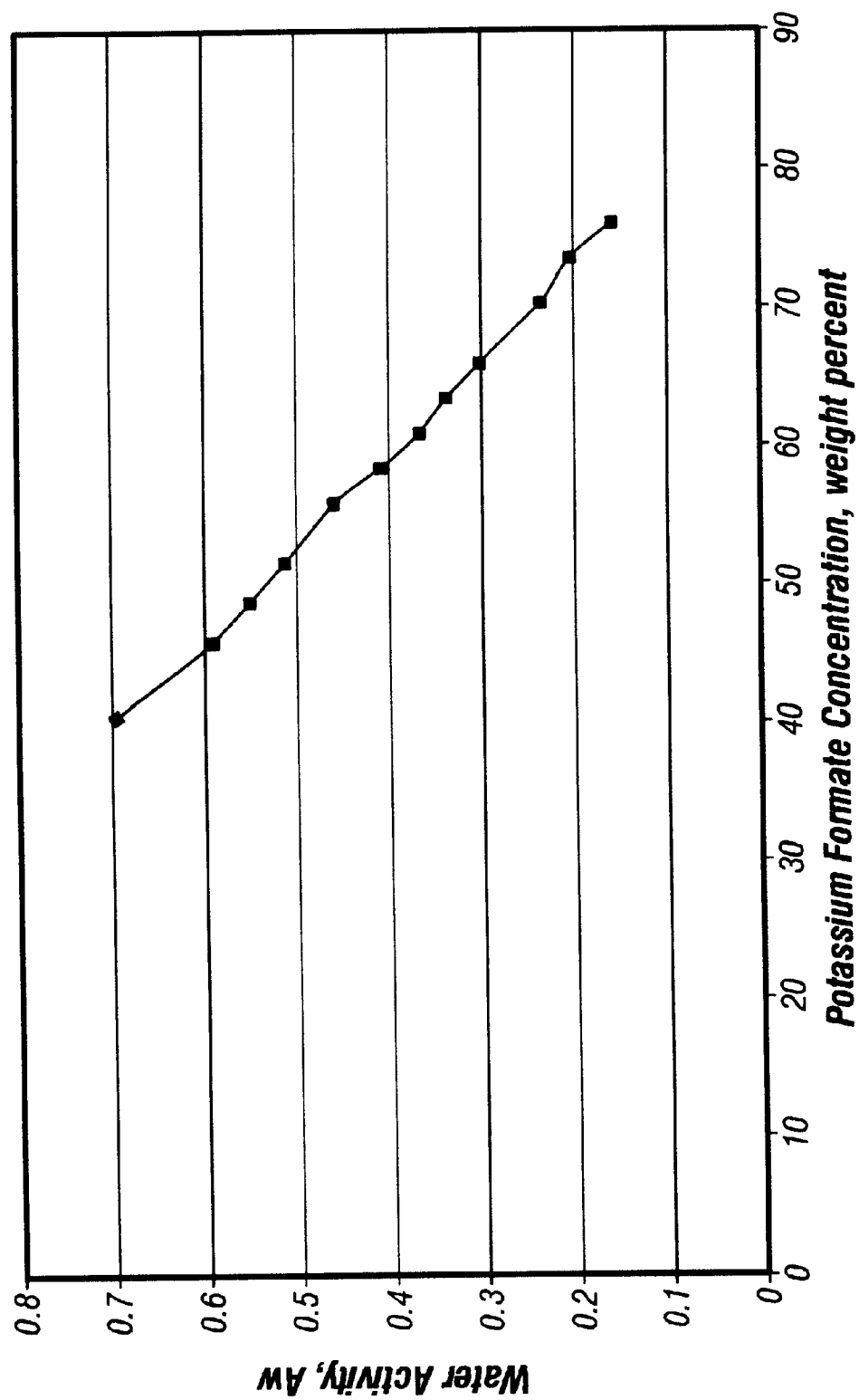
FIG. 1 is a graph of the water activity of potassium formate versus the weight percent concentration of potassium formate.

An improved method is provided for reducing borehole erosion during drilling a borehole in a hydrocarbon bearing subterranean formation. The method is believed to have the effect of stabilizing shale formations during drilling, while providing environmentally friendly or hydrophilic drilling fluid components to the drilling fluid for effecting such stabilization with increased flexibility regarding concentration of solvents for such components.

In the method, an invert emulsion is prepared or obtained. Preferably, the invert emulsion is comprised of an oil or synthetic as the continuous phase and water or brine as the discontinuous phase. The oil or synthetic is most preferably environmentally friendly or biodegradable. Examples of some preferred oils include, without limitation, JNVERMUL®, PETROFREE® LV, PETROFREE® SF, all available from Halliburton Energy Services, Inc., Houston, Tex. The invention may also be successfully used with invert emulsions comprising diesel oils, as will be discussed briefly in the examples below. As used herein, unless indicated to the contrary, the term "oil" or "oils" shall be understood to mean synthetics and esters as well as natural oils such as diesel oil and mineral oil.

An invert emulsion, is prepared by known methods, generally formulated with emulsifiers known to those skilled in the art. Common drilling fluid additives, such as, for example, without limitation, barite for adding density to the fluid, may also be used or added to the emulsion fluid. However, instead of adding calcium chloride to the fluid as known in the art, a formate or acetate is added. The most preferred formate for the present invention is potassium formate.

Potassium formate is more environmentally friendly than calcium chloride. It has been used with water-based completion and work-over fluids to help impart stability to the fluids at high temperatures. However, this function relates to electrolyte stability of the water-based fluids, a function not provided by potassium formate in (or applicable to) oil-based muds.

Potassium formate is more water soluble than calcium chloride, and in oil based fluids, potassium formate has previously been thought to likely cause breaking of invert emulsions, with consequent wetting of shales, and borehole collapse. However, we have discovered a method of applying potassium formate (or other formate or acetate) that results in a successful, stable, invert emulsion fluid and substantial elimination or significant reduction in borehole erosion.

Moreover, unexpectedly, in the method of the invention, potassium formate actually provides even more flexibility than calcium chloride with respect to water activity, and concentration, and is useful at significantly lower temperatures, due to a lower freezing point at high concentrations. Potassium formate has a freezing point of 18° F. at saturation, and a much improved water activity for drilling at this level than does calcium chloride or even calcium nitrate. The freezing point of calcium chloride at saturation is about 54° F. and of calcium nitrate at saturation is about 65° F. Exceeding the freezing point of the salt solution emulsified in the water phase is believed to likely cause emulsion stability problems. Also, as shown in FIG. 1, potassium formate has a broad concentration range for desired levels of water activity when used according to the method of this invention. Further, as shown by the field data in the examples below, potassium formate in drilling fluids provides improved shale stabilization results, as demonstrated by the very low levels of borehole erosion during drilling.

In the method of the invention, the water activity of the subterranean formation and particularly of the shale formation is measured or determined. The water activity of the invert emulsion fluid for drilling a borehole in the formation is also preferably measured or determined. Activity ($A_W$) is a measure of the osmotic dehydration/hydration potential of water in a drilling fluid or shale. The measurement is relative—whether a given drilling fluid will draw water from a shale, allow the shale to absorb water from the mud, or be in balance with no water movement.

The typical or traditional test procedure for measuring $A_W$ calls for measuring the vapor pressure of a shale sample and of the invert emulsion drilling fluid. An electrical or mechanical hygrometer may be used for the measurements. Vapor pressure is a direct measure of water activity. If the $A_W$ of the shale is lower than the $A_W$ of the drilling fluid, the shale will absorb water. To stop the water movement, potassium chloride (or other formate or acetate) is added to the drilling fluid until the drilling fluid's $A_W$ matches that of the shale.

In the most preferred embodiment of the invention, potassium formate is originally added to the fluid in sufficient quantities to cause the water activity of the fluid to approximately equal or be less than the formation water activity. Typically, the activity of the emulsion fluid will be about 0.6 or lower. Preferably, the difference in the formation water activity, particularly the formation shale water activity, and the water activity of the emulsion fluid will always be lower than the water activity of the shale. Also, preferably, the water activity of the drilling fluid will be monitored during drilling with respect to the water activity of the formation being drilled. The concentration of potassium formate in the drilling fluid will very likely decrease or decline during the drilling process over time, as some may be lost with the removal of the drill cuttings, some may be lost in the formation, etc. Daily or other routine or regular monitoring of water activities of the drilling fluids and of the formation are generally preferred or recommended. Potassium formate (or other formate or acetate) should be added as needed to maintain the preferred ratios of water activity of the drilling fluid with respect to water activity of the formation. Measurements of the borehole consistency or erosion may also be made. Borehole erosion occurs when the shale becomes water wet, indicating water activity of the formation and water activity of the drilling fluid are not in balance and water is flowing from the drilling fluid into the formation.

Monitoring the water activity of the drilling fluid during drilling may be conducted in several known ways. Preferably for this invention, the monitoring is done by taking regular measurements (about daily) of the water activity of, for example, the formation, at least in the vicinity of the drilling, and of the drilling fluid being used for the drilling. Water activity of the formation should preferably be measured directly, as opposed to indirectly from drilled cuttings from the formation. Cuttings may not represent the in-situ formation properties, as the native Aw may become altered by the mud as the cuttings are transported up the hole.

Experiments

A number of experiments were conducted which demonstrate the present invention. The results of these experiments are tabulated and discussed below. Table 1 compares the very low water activity commonly seen with potassium formate as it is known to be used in brines or water-based drilling fluids with the water activity of potassium formate in oil-based mud as used according to the method of the invention. The extremely low water activity that occurs in brine would be expected to break an invert emulsion. However, as shown in Table 1, potassium formate has a higher water activity in oil based muds or drilling fluids. Tables 2, 3 and 4 compare the properties of three samples of oil based muds formulated with different salts—potassium formate, calcium chloride, and calcium nitrate. The data shows the mud with the potassium formate to have the strongest or most stable invert emulsion and the lowest water activity.

TABLE 1

Comparison of Water Activity for an INVERMUL ™ Field Mud Formulated with Potassium Formate and a 13.2 lb/gal. Potassium Formate Brine at Various Time Intervals

| Measurement Interval | Field Mud | KCOOH Brine* |
| --- | --- | --- |
| 15 min. | 0.3613 | 0.1539 at 68.9° F. |
| 1 hr. | 0.3325 | 0.1549 at 68.8° F. |
| 2 hr. | 0.3229 | 0.1553 at 68.6° F. |
| 3 hr. | 0.3185 | 0.1570 at 68.4° F. |
| 4 hr. | 0.3178 | 0.1584 at 68.3° F. |
| 5 hr. | 3.3178 | 0.1539 at 68.2° F. |
| Average Aw | 0.3219 | |

*Note: 76.3 wt % Potassium formate brine at 13.2 lb/gal.

The procedure used for measuring water activities was as follows: A 100 gram fluid sample was tested at room temperature with a pre-equilibrated hygrometer probe with the tip of the probe about 1.2 to about 1.5 cm above the test fluid surface. After equilibrium was reached (about 15 minutes), the relative humidity and temperature were measured and recorded, and these measurements were repeated at one hour intervals for four hours. If all of the relative humidity measurements were similar (i.e., with a variance within +/−10%), then an average relative humidity measurement was calculated. This average measurement was converted to water activity by dividing by 100.

TABLE No. 2

Properties for an INVERMUL ™ Field Mud Formulated with Potassium Formate

| | | |
|---|---|---|
| Density, lb/gal | | 9.7 |
| Test temperature for rheological properties, ° F. | 120 | 150 |
| Plastic viscosity, Cp | 23 | 15 |
| Yield point, lb/100 ft2 | 23 | 20 |
| 10/Sec gels, lb/100 ft2 | 22 | 18 |
| 10 Min gels, lb/100 ft2 | 27 | 21 |
| Electrical stability, v | 1136 | 1103 |
| HTHP filtrate at 250° F. and 500 psid, ml/30 min | 55.6, all oil | |
| Excess lime, lb/bbl | 4.68 | |
| Oil, volume % by Retort | 81.3 | |
| Water, volume % by Retort | 3.0 | |
| Oil/Water Ratio | 96/4 | |
| Total solids, volume % by Retort | 15.7 | |
| Water activity at ambient temperature (68–72° F.), Aw at progressive time intervals | | |
| Aw at 5 min. | 0.3613 | |
| Aw at 1 hr. | 0.3325 | |
| Aw at 2 hr. | 0.3229 | |
| Aw at 3 hr. | 0.3185 | |
| Aw at 4 hr. | 0.3178 | |
| Aw at 5 hr. | 0.3178 | |
| Fann 35A viscometer dial readings: | | |
| Test temperature for dial readings, ° F. | 120 | 150 |
| 600 rpm | 69 | 50 |
| 300 rpm | 46 | 35 |
| 200 rpm | 37 | 28 |
| 100 rpm | 27 | 21 |
| 6 rpm | 14 | 12 |
| 3 rpm | 13 | 11.5 |
| Supplemental Data | | |
| Lubricity coefficient | 0.105 | |
| Particle size distribution summary: | | |
| Mean particle size, μm | 5.540–5.640 | |
| Median particle size, μm | 2.929–3.017 | |

TABLE No. 3

Properties for an INVERMUL ™ Field Mud Formulated with Calcium Chloride

| | | |
|---|---|---|
| Density, lb/gal | | 0.8 |
| Test temperature for rheological properties, ° F. | 120 | 150 |
| Plastic viscosity, Cp | 17 | 11 |
| Yield point, lb/100 ft2 | 9 | 8 |
| 10/Sec gels, lb/100 ft2 | 13 | 11 |
| 10 Min gels, lb/100 ft2 | 21 | 16 |
| Electrical stability, v | 767 | 754 |
| HTHP filtrate at 250° F. and 500 psid, ml/30 min | 29.6 (29.2-oil/0.4-water) | |
| Excess lime, lb/bbl | 4.68 | |
| Water Phase Salinity, ppm | 198,373 | |
| Oil, volume % by Retort | 77.8 | |
| Water, volume % by Retort | 8.7 | |
| Oil/Water Ratio | 90/10 (89.9/10.1) | |
| Total solids, volume % by Retort | 13.5 | |
| Corrected solids, volume % | 12.95 | |
| Low gravity solids, lb/bbl | 98.97 | |
| Low gravity solids, volume % | 10.86 | |
| Water activity at various ambient temperatures, Aw at progressive time intervals | | |
| Aw at 15 min. | 0.6343 at 69.2° F. | |
| Aw at 1 hr. | 0.6680 at 69.7° F. | |
| Aw at 2 hr. | 0.6715 at 71.1° F. | |
| Aw at 3 hr. | 0.6660 at 73.7° F. | |
| Aw at 4 hr. | 0.6634 at 74.9° F. | |
| Aw at 16 hr. | 0.6210 at 687° F. | |

TABLE No. 3-continued

Properties for an INVERMUL ™ Field Mud Formulated with Calcium Chloride

| | | |
|---|---|---|
| Fann 35A viscometer dial readings: | | |
| Test temperature for dial readings, ° F. | 120 | 150 |
| 600 rpm | 43 | 30 |
| 300 rpm | 26 | 19 |
| 200 rpm | 21 | 15 |
| 100 rpm | 14 | 11 |
| 6 rpm | 7 | 5.5 |
| 3 rpm | 6 | 5 |
| Supplemental Data | | |
| Particle size distribution summary: | | |
| Mean particle size, μm | 8825 | |
| Median particle size, μm | 4.569 | |

TABLE No. 4

Properties for an INVERMUL ™ Field Mud Formulated with Calcium Nitrate

| | | |
|---|---|---|
| Density, lb/gal | | 8.9 |
| Test temperature for rheological properties, ° F. | 120 | 150 |
| Plastic viscosity, Cp | 17 | 12 |
| Yield point, lb/100 ft2 | 13 | 11 |
| 10/Sec gels, lb/100 ft2 | 14 | 12 |
| 10 Min gels, lb/100 ft2 | 23 | 18 |
| Electrical stability, v | 721 | 647 |
| HTHP filtrate at 250° F. and 500 psid, ml/30 min | 21.2 (19.6-oil/1.6-water) | |
| Excess lime, lb/bbl | 4.88 | |
| Oil, volume % by Retort | N/A | |
| Water, volume % by Retort | N/A | |
| Oil/Water Ratio | 96/10 | |
| Total solids, volume % by Retort | N/A | |
| Water activity at ambient temperatures, Aw at progressive time intervals | | |
| Aw at 15 min. | 0.6957 at 69.8° F. | |
| Aw at 1 hr. | 0.7195 at 70.0° F. | |
| Aw at 2 hr. | 0.7290 at 71.8° F. | |
| Aw at 3 hr. | 0.7285 at 74.4° F. | |
| Aw at 4 hr. | 0.7313 at 75.6° F. | |
| Aw at 16 hr. | 0.7063 at 69.3° F. | |
| Fann 35A viscometer dial readings: | | |
| Test temperature for dial readings, ° F. | 120 | 150 |
| 600 rpm | 47 | 35 |
| 300 rpm | 30 | 23 |
| 200 rpm | 23 | 18 |
| 100 rpm | 16 | 13 |
| 6 rpm | 7 | 6 |
| 3 rpm | 6 | 5 |
| Supplemental Data | | |
| Particle size distribution summary: | | |
| Mean particle size, μm | 24.57 | |
| Median particle size, μm | 18.44 | |

In the field, two wells were drilled in the same basic area with the same hole size and about the same depth (4,100 m to 4,150 m) but with different drilling fluids. For one well, the oil-based drilling fluid comprised an invert emulsion with potassium formate and properties substantially like the fluid of Table 2 above. For the other well, the oil based drilling fluid comprised essentially the same invert emulsion, except with calcium chloride instead of with potassium formate. The well drilled with fluid comprising potassium formate had half the losses of fluid compared to the well drilled with fluid comprising calcium chloride ($142m^3$:$286m^3$). Further, the well drilled with drilling fluid comprising potassium formate had less than half the overhole than the well drilled with fluid comprising calcium chloride (according to the caliper logs (7%:16%)). This data shows that the drilling fluid comprising potassium formate, used according to the method of the invention, provides a more stable, consistent hole than known previously in the art.

In four boreholes drilled with drilling fluid comprising potassium formate according to the method of the invention, actual borehole volume measurements were compared to theoretical values at different depths. Again, the fluid had properties substantially like the fluid of Table 2 above. The actual gauge hole volume values each time were remarkably close to the theoretical estimates. Specifically, for the first well, the total calculated borehole volume was 71.6m$^3$; the actual gauge hole volume was 70.36 m$^3$. For the second well, the calculated borehole volume was 81.3 m$^3$; the actual gauge hole volume was 78.5 M$^3$. For the third well, the calculated borehole volume was 83.2 m$^3$; the actual gauge hole volume was 76.3 m$^3$. For the fourth well, the calculated borehole volume was 78.2 m; the actual gauge hole volume was 74.10 m$^3$.

The foregoing description of the invention is intended to be a description of preferred embodiments. Various changes in the details of the described method can be made without departing from the intended scope of this inventions as defined by the appended claims.

I claim:

1. A method for reducing borehole erosion during drilling with an oil-based drilling fluid in a subterranean formation wherein said method comprises:

preparing or obtaining al oil-based drilling fluid;

determining the water activity of the formation;

determining the water activity of the drilling fluid;

adding sufficient formate or acetate to said drilling fluid such that said water activity of said drilling fluid is less than or about equal to the water activity of said formation;

using said drilling fluid comprising said formate or acetate in drilling said borehole; and monitoring said water activity of said formation and said water activity of said drilling fluid during said drilling; and adding additional formate or acetate to said drilling fluid as needed to maintain the water activity of said drilling fluid lower than or about equal to the water activity of said formation.

2. The method of claim 1 wherein said formate or acetate is potassium formate.

3. The method of claim 2 wherein said oil-based fluid comprises an invert emulsion and said potassium formate is dissolved in the water phase of said emulsion.

4. The method of claim 1 wherein said oil-based drilling fluid is biodegradable.

5. The method of claim 1 wherein said formation further comprises shale.

6. A method for drilling a borehole through a subterranean formation, said method comprising:

preparing or obtaining an oil-based drilling fluid;

determining the water activity of said drilling fluid and the water activity of said formation;

adding sufficient formate or acetate to said drilling fluid such that said water activity of said drilling fluid is less than or about equal to the water activity of said formation;

using said drilling fluid comprising said formate or acetate in drilling said borehole;

monitoring said water activity of said formation and said water activity of said drilling fluid during said drilling; and adding additional formate or acetate to said drilling fluid as needed to maintain the water activity of said drilling fluid lower than or about equal to the water activity of said formation.

7. The method of claim 6 wherein said formate or acetate is potassium formate.

8. The method of claim 7 wherein said oil-based fluid comprises an invert emulsion and said potassium formate is dissolved in the water phase of said emulsion.

9. The method of claim 6 wherein said oil-based drilling fluid is biodegradable.

10. A method of stabilizing an invert emulsion for use in drilling a borehole in or through a subterranean formation, said method comprising:

preparing or obtaining an invert emulsion or an oil-based drilling fluid comprising an invert emulsion;

determining the water activity of the formation;

determining the water activity of the emulsion;

adding sufficient formate or acetate to said drilling fluid such that said water activity of said emulsion is less than or about equal to the water activity of said formation;

using said emulsion comprising said formate or acetate in drilling said borehole;

monitoring said water activity of said formation and said water activity of said emulsion during said drilling; and adding additional formate or acetate to said emulsion as needed to maintain the water activity of said emulsion lower than or about equal to the water activity of said formation.

11. The method of claim 10 wherein said formate or acetate is potassium formate.

12. The method of claim 11 wherein said potassium formate is dissolved in the water phase of said emulsion.

13. The method of claim 10 wherein said oil-based drilling fluid is biodegradable.

14. The method of claim 10 wherein said formation further comprises shale.

15. The method of claim 10 wherein said emulsion comprises a synthetic fluid.

16. The method of claim 10 wherein said emulsion comprises an ester.

* * * * *